United States Patent
Sachs

(10) Patent No.: US 6,620,894 B2
(45) Date of Patent: Sep. 16, 2003

(54) START-UP PROCEDURE FOR MULTIPLE CATALYST POLYMERIZATION SYSTEMS

(75) Inventor: William Howard Sachs, Princeton, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 10/010,185

(22) Filed: Dec. 6, 2001

(65) Prior Publication Data

US 2002/0132937 A1 Sep. 19, 2002

Related U.S. Application Data

(60) Provisional application No. 60/256,291, filed on Dec. 18, 2000.

(51) Int. Cl.[7] .............................................. C08F 2/38
(52) U.S. Cl. ......................... 526/82; 526/87; 526/113; 526/201; 526/905; 526/943; 526/86
(58) Field of Search .............................. 526/82, 86, 113, 526/87, 943, 905, 201

(56) References Cited

U.S. PATENT DOCUMENTS 4,935,474 A * 6/1990 Ewen et al. ................ 526/114
5,693,727 A   12/1997 Goode et al. ................ 526/86

FOREIGN PATENT DOCUMENTS

| EP | 0 770 629 A | 5/1997 |
| WO | WO 98/02247 | 1/1998 |
| WO | WO 99/03899 | 1/1999 |
| WO | WO 99/31142 | 6/1999 |

* cited by examiner

Primary Examiner—David W. Wu
Assistant Examiner—William K Cheung
(74) Attorney, Agent, or Firm—Osborne K. McKinney

(57) ABSTRACT

This invention relates to a method to start up an olefin polymerization process comprising:

a. calculating a trajectory, from elements including catalyst deactivation rate constants ($k_d$), for the rate of introduction of a catalyst system, into a reactor, said catalyst system comprising two different metal catalyst compounds (A and B) and at least one activator, wherein the ratio of the deactivation constants of the two different metal catalyst compounds $k_d^A/k_d^B$ is not 1; and b. introducing olefin monomer, a catalyst system, optional co-monomer, and optional chain transfer or termination agents into a polymerization reactor in a manner such that the catalyst system introduction rate is manipulated to follow the trajectory until a desired production rate is achieved.

20 Claims, 1 Drawing Sheet

START-UP PROCEDURE FOR MULTIPLE CATALYST POLYMERIZATION SYSTEMS

This application claims benefit of Provisional Application No. 60/256,291, filed Dec. 18, 2000.

FIELD OF THE INVENTION

This invention relates to a startup procedure for polymerization systems using multiple catalyst compounds that reduces the amount of undesired product produced during start-up.

BACKGROUND OF THE INVENTION

Higher molecular weight generally confers desirable mechanical properties and stable bubble formation onto olefin polymers. However, it can also inhibit extrusion processing by increasing backpressure in extruders, promoting melt fracture defects in the inflating bubble and potentially, promoting too high a degree of orientation in the finished film. To remedy this, one may combine a second lower molecular weight polymer with the first to reduce extruder backpressure and inhibit melt fracture. This combination can be achieved by blending the polymers physically or by co-producing them at the same time. For example, Mobil, in their patent application WO99/03899, discloses using a metallocene type catalyst and a Ziegler-Natta type catalyst in the same reactor to produce a processable high density polyethylene.

Other dual catalyst systems have been used in the past for a variety of reasons. For example WO 98/02247 discloses a dual catalyst system of a metallocene and a non-metallocene (TiCl$_4$+alcohol) treated with the contact product of dialkylmagnesium and trialkylsilanol. WO 98/02247 discloses dual metallocene systems and describes the idea that the two different transition metal sources exhibit a different hydrogen response under the same polymerization and hydrogen conditions as critical. (Hydrogen response is the sensitivity of the catalyst to manipulation by adding or subtracting hydrogen to or from the polymerization system to produce different products.) Likewise, U.S. Pat. No. 4,935,474 discloses olefin polymerization in the presence of two or more metallocenes (activated with alumoxane) each having a different propagation and termination rate constants. Liquid mixtures of many classes of catalysts are disclosed for use in gas phase polymerization in U.S. Pat. No. 5,693,727. U.S. Pat. No. '727 discloses that more than one liquid metallocene may be employed. Similarly, EP 0 770 629 A discloses a process to produce bimodal polymers using two reactors in series. In some circumstances only the reaction conditions and monomer feeds are changed in the second reactor. In other circumstances a second different catalyst is added to the second reactor.

Hence, one-step polymerization processes to produce bi-modal polymers have become very desirable because of their perceived efficiencies in production and cost. These methods are more difficult to start up however, because two different catalysts, sometimes having very different reactivities and kinetic profiles, need to be stabilized during start-up. One method to do so is to bring the first catalyst on-line, stabilize it, then introduce the second catalyst and allow the system to stabilize. This has the disadvantage of requiring significant amounts of time, however, and producing significant amounts of undesired polymer. Nor can this method be used for dual catalyst systems in which both catalysts are co-deposited on the same support material, or intimately co-mixed in solution or spray-dried formulations. In some instances prior to start up, the polymerization reactor is charged with an initial polymer bed comprised of the product to be produced. Surprisingly, this approach by itself is not sufficient to eliminate undesired product produced during start up.

WO 99/31142 discloses a start up method for a gas polymerization reactor using a Ziegler-Natta type catalyst that increases the partial pressure of the olefin and the catalyst introduction rate into the reactor whilst maintaining the ratios of the partial pressures of the olefin to the hydrogen and to any co-monomer present. The method disclosed by WO 99/31142, however, cannot be applied to one-step polymerization processes using dual catalyst systems because it fails to consider the effect of the prescribed rate of increase in the olefin partial pressure and the catalyst introduction rate on the product properties of the polymers being manufactured. More specifically, in order to minimize the amount of undesired product produced during the startup of a one-step polymerization process using dual catalyst systems, it is beneficial to consider the reactivities or kinetic profiles (or both) of each catalyst comprising the dual catalyst system in concert with other characteristics of the polymerization process, such as initial polymer bed composition, target production rate, and residence time.

An important product property that may vary during the startup of a one-step polymerization process using dual catalyst systems is the split or relative mass of polymer in the product that has been produced by each of the catalyst components. Because this is often a product characteristic with narrow specification limits, especially for products with bimodal molecular weight distributions, it is desirable to control the relative amounts of polymer produced during all phases of the manufacturing process, including startup and transitions.

The present invention describes a process for reducing the amount of undesired product produced (for example a product whose split of the relative amounts of the polymers is outside the specification limits) during start up of continuous one-step olefin polymerization processes carried out with dual catalyst systems in well-mixed reactors.

The instant invention preferably manipulates the rate of introduction of catalyst into the polymerization reactor during start up using pre-defined trajectories, and prescribes methods for defining and evaluating these trajectories in a manner that accounts for the kinetic profile of the catalyst system in concert with other characteristics of the polymerization process.

BRIEF DESCRIPTION OF THE INVENTION

This invention relates to a method to start up an olefin polymerization process comprising:

a. calculating a trajectory, from elements including catalyst deactivation rate constants ($k_d$), for the rate of introduction of a catalyst system, into a reactor, said catalyst system comprising two different metal catalyst compounds (A and B) and at least one activator, wherein the ratio of the deactivation constants of the two different metal catalyst compounds $k_d^A/k_d^B$ is not 1; and b. introducing olefin monomer, a catalyst system, optional co-monomer, and optional chain transfer or termination agents into a polymerization reactor in a manner such that the catalyst system introduction rate is manipulated to follow the trajectory until a desired production rate is achieved.

The term "start up" is used herein as it is used in the art (for example, as used in WO 99/31142) to refer to that time period when a desired product is first targeted, wherein polymerization system changes commence or are first made to achieve the desired product, up to that time when no additional substantial changes are intended and the polymerization system stabilizes on producing the desired product at maximized production rates.

The rate of introduction of the catalyst system is preferably controlled so as to follow a pre-determined trajectory that has been selected as described below. In a preferred embodiment other reactor conditions such as pressure and temperature remain substantially constant. By "substantially constant" is meant that the reactor condition in question does not vary enough to alter the product produced, typically the variation is less than 10%, preferably less than 5%, preferably less than 3%, more preferably less than 1%.

DETAILED DESCRIPTION OF THE INVENTION

Figure 1:
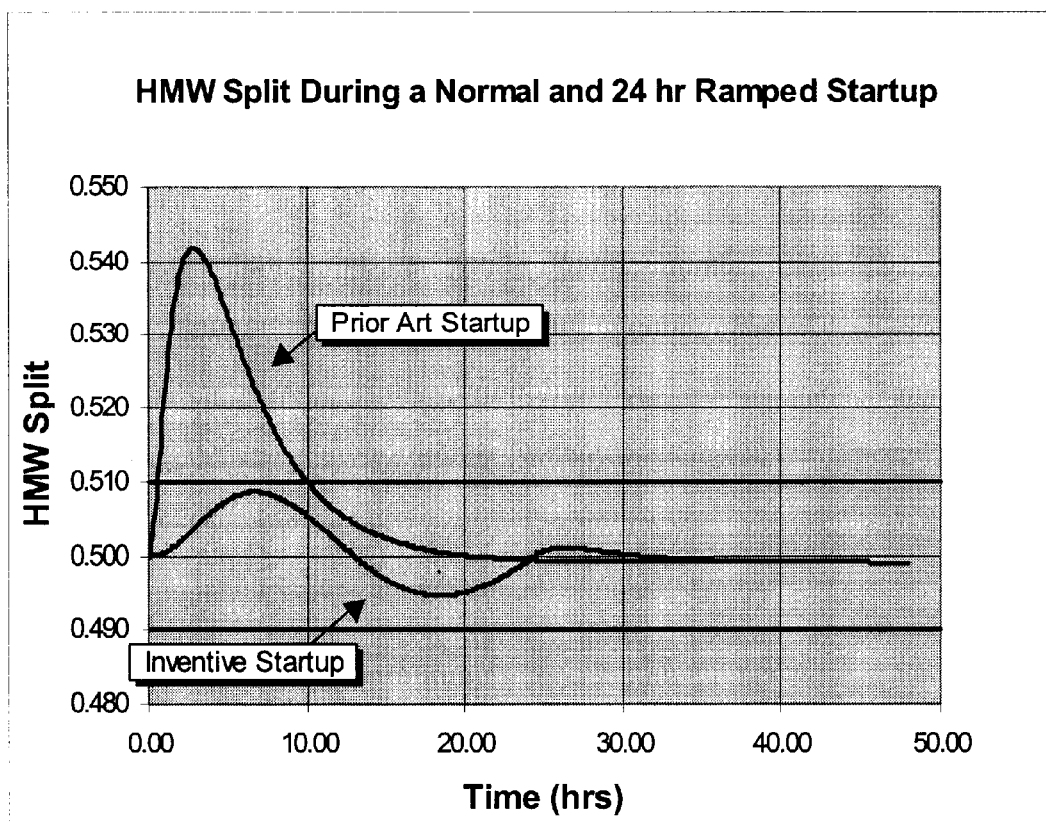
FIG. 1 shows that the weight fraction of polymer produced by Catalyst A in product discharged from the reactor remains at all times within the desired specification limits during the start up period.

In a preferred embodiment, this invention relates to a method to start up an olefin polymerization process comprising:

a. calculating a trajectory, from elements including catalyst deactivation rate constants ($k_d$), for the rate of introduction of a catalyst system, into a reactor, said catalyst system comprising two different metal catalyst compounds (A and B) and at least one activator, wherein the ratio of the deactivation constants of the two different metal catalyst compounds $k_d^A/k_d^B$ is not 1; and b. introducing olefin monomer, a catalyst system, optional co-monomer, and optional chain transfer or termination agents into a polymerization reactor in a manner such that the catalyst system introduction rate is manipulated to follow the trajectory until a desired production rate is achieved.

In a preferred embodiment, other reactor conditions such as pressure, temperature, ratio of monomer to comonomer, ratio of chain transfer or termination agent to monomer and the like remain substantially constant.

Production Rate

The present invention is based on an analysis of the dynamic behavior of dual catalyst systems during the start up of continuous, well-mixed olefin polymerization reactors. Preferred well-mixed reactors include gas phase reactors, slurry phase reactors and solution phase reactors.

In a preferred embodiment, a continuous gas-phase polymerization reactor is charged with an initial polymer bed of weight $W_b$ and volume V, consisting of polymer produced previously with a dual catalyst system made up of catalysts A and B. In a preferred embodiment of this invention, this initial polymer charge is the same as the product to be manufactured, which has a target composition consisting of $100 \cdot S_T$ weight percent polymer produced by catalyst A, and $100 \cdot (1-S_T)$ weight percent polymer produced by catalyst B. The catalyst system used in this invention is formulated to produce the desired polymer product under desired steady-state operating conditions. This formulation can be conveniently characterized by $E_c^A$ and $E_c^B$, the molar loading of catalysts A and B (as determined by the presence of the metals of A and B) in moles per unit of mass of the catalyst mixture.

Before start up, the reactor is brought to production conditions with the desired monomer partial pressure, and optional co-monomer and chain transfer or termination agents in specified molar ratios with monomer. A diluent such as nitrogen may be added to achieve the desired total reactor pressure. All other conditions required for normal reactor usage are also established prior to start up, for example the reactor is brought to the desired temperature and stabilized prior to start up.

The polymerization reaction is typically initiated by introducing the catalyst system to the reactor at a feed rate $q_c$, which may vary during start up, but which will ultimately reach the value $q_c^S$ required to achieve the desired steady-state production rate $P_R^S$ and product split $S_T$. Preferably, the production rate due to the inventory of active catalyst of type A in the polymerization reactor can be written as, $$P_R^A = (V\mu_0^A)\overline{m_{M_1}^A} k_{p1}^A M_1^{O^A} \qquad \text{Equation 1.1}$$

while the production rate due to the inventory of active catalyst of type B is given by, $$P_R^B = (V\mu_0^B)\overline{m_{M_1}^B} k_{p1}^B M_1^{O^B} \qquad \text{Equation 1.2}$$

where $V\mu_0^A$ and $V\mu_0^B$ are the inventories of active catalyst of each type in the reactor, $\overline{m_{M_1}^A}$ and $\overline{m_{M_1}^B}$ the weight of polymer produced per mole of monomer polymerized by each catalyst, $k_{p1}^A$ and $k_{p1}^B$ the effective propagation rate constants or activities for polymerization of monomer by each catalyst, $M_1$ the concentration of monomer dissolved in the polymer of multiphase polymerization processes such as gas-phase and slurry phase processes, or in the solvent of a solution polymerization process, and $O^A$ and $O^B$ the monomer reaction order for each catalyst. The total production rate is simply the sum of Equations 1.1 and 1.2, $$P_R = P_R^A + P_R^B \qquad \text{Equation 1.3}$$

In a preferred embodiment of this invention the olefin monomer is introduced to the reactor along with optional co-monomer and chain transfer or termination agents in a manner that maintains the partial pressure of the olefin monomer, while maintaining the ratios of the partial pressures of olefin monomer to any co-monomer and chain transfer or termination agents present. For such embodiments, $M_1$, $\overline{m_{M_1}^A}$ and $\overline{m_{M_1}^B}$ can be regarded as constants. For multiphase polymerization processes, the value of $M_1$ can be obtained from knowledge of the monomer partial pressure using methods well known in the art, for example Henry's Law or various equations of state for estimating the solubility of small hydrocarbons in polyolefins. The values of $\overline{m_{M_1}^A}$ and $\overline{m_{M_1}^B}$ are determined by the identity of each catalyst, and reactor conditions such as temperature and the ratio of olefin monomer to co-monomer and can be estimated from monomer consumption or polymer property data.

The rate of change in the inventory of active catalyst of type A and B in the polymerization reactor can be obtained from simple mass balance relationships, $$\frac{d(V\mu_0^A)}{dt} = E_c^A q_c - k_d^A (V\mu_0^A) - \frac{1}{\tau}(V\mu_0^A) \qquad \text{Equation 1.4}$$

$$\frac{d(V\mu_0^B)}{dt} = E_c^B q_c - k_d^B (V\mu_0^B) - \frac{1}{\tau}(V\mu_0^B) \qquad \text{Equation 1.5}$$

where $k_d^A$ and $k_d^B$ are the first-order rate constants for deactivation of each catalyst type, and $\tau$ the instantaneous residence time of catalyst and polymer in the reactor bed.

In a preferred embodiment of this invention, product is continuously or intermittently discharged from the polymerization reactor in a manner that maintains a constant volume, level or weight of product in the reactor. For such embodiments, $$\frac{1}{\tau} = \frac{P_R}{W_b} \qquad \text{Equation 1.6}$$

where $W_b$ is as described in equation 1.9.

At the instant of reactor start up, $$V\mu_{0,t=0}{}^A = V\mu_{0,t=0}{}^B = P_{R,t=0} = 0 \qquad \text{Equation 1.7}$$

Those skilled in the art will recognize that Equations 1.1–1.7 provide the means for calculating the production rate of polymer produced by a dual catalyst system in continuous, well-mixed one-step olefin polymerization processes under transient conditions, including reactor start up.

Product Composition or Split

The composition or cumulative split of bulk product discharged from a well-mixed polymerization reactor can be calculated from, $$S_c = \frac{W_b^A}{W_b} \qquad \text{Equation 1.8}$$

$$W_b = W_b^A + W_b^B \qquad \text{Equation 1.9}$$

where $W_b^A$ and $W_b^B$ represent the weight of product presently in the reactor that was produced by catalysts A and B.

It will be readily understood by those skilled in the art, that the rate of change in the weight of product in the reactor produced by each catalyst can also be obtained from the mass balance relationships, $$\frac{dW_b^A}{dt} = P_R^A - \frac{1}{\tau}W_b^A \qquad \text{Equation 1.10}$$

$$\frac{dW_b^B}{dt} = P_R^B - \frac{1}{\tau}W_b^B \qquad \text{Equation 1.11}$$

In one embodiment of this invention in which the initial polymer charge is substantially the same as the product to be manufactured, and product is continuously or intermittently discharged from the polymerization reactor in a manner that maintains a constant volume, level or weight of product in the reactor, at the instant of start up, $$W_{b,t=0}{}^A = W_b S_T \qquad \text{Equation 1.12}$$

$$W_{b,t=0}{}^B = W_b(1-S_T) \qquad \text{Equation 1.13}$$

Those skilled in the art will recognize that Equations 1.1–1.13 provide the means for calculating the composition or split of polymer produced by dual catalyst systems in continuous one-step olefin polymerization processes carried out in well-mixed reactors under transient conditions, including reactor start up. By incorporating features of the kinetic profiles of the individual catalysts comprising dual catalyst systems, such as their rate of deactivation, Equations 1.1–1.13 provide the basis for constructing and evaluating the trajectories for manipulating the rate of introduction of catalyst during start up, that are the subject of this invention.

Yet another method for calculating the composition or split of polymer produced by dual catalyst systems in continuous one-step polymerization processes carried out in well-mixed reactors under transient conditions, including reactor start up, is to employ readily available software programs for the dynamic simulation of polymerization processes. Such software programs, for example POLYRED from the University of Wisconsin Polymerization Reaction Engineering Laboratory, are well known in the art.

Trajectory Definition and Evaluation

Pre-defined trajectories for manipulating the rate of introduction of catalyst that reduce the amount of undesired product produced during start up of one-step polymerization processes using dual catalyst systems can be constructed by many different methods. However, in the present invention, quantitative criteria are useful for comparing trajectories for purposes of ranking their performance.

One simple quantitative method involves using Equations 1.1–1.13, or a suitable software program such as POLYRED 5.0, to compute the amount of off-grade production, $Y_{OG}$, that will be generated during startup, then to rank the trajectories according to the amount of off-grade product generated and select the trajectory that results in the least amount of off-grade production. Off-grade production is defined as product in which the weight fraction of polymer produced by catalyst A lies outside the specification interval, $S_T \pm \delta$, where $\delta$ is determined by product performance requirements.

If the time allotted for production is fixed, another advantageous procedure is to use Equations 1.1–1.13, or a suitable software program such as POLYRED 5.0, to compute the amount of off-grade production, $Y_{OG}$, that will be generated during startup, as above, together with the amount of aim-grade product, $Y_{AG}$, produced during the total amount of time allotted for production, and to rank trajectories by their net return or value, $$\text{Net Return} = Y_{AG} \cdot M_{AG} + Y_{OG} \cdot M_{OG} \qquad \text{Equation 1.14}$$

where $M_{AG}$ and $M_{OG}$ are the net margins (in e.g. \$/lb) for aim-grade and off-grade product, respectively.

The use of quantitative criteria, such as those described above, further provide a means for the automatic construction of trajectories for manipulating the rate of introduction of catalyst, using methods well known in the art. These trajectories are not limited to smooth, continuous variation in the rate of introduction of catalyst to the reactor during the startup period; they may also include one or more intermittent pauses or step changes in the rate of introduction of catalyst to the reactor during the startup period. Those skilled in the art will recognize that trajectories for manipulating the rate of introduction of catalyst determined in this manner will depend on the criteria used, on the classes of parametric functions considered for $q_c$, on the kinetic profiles of catalyst A and B, and on the reactor operating conditions selected for the production of aim-grade product.

An example of a simple, beneficial class of parametric functions for the rate of introduction of catalyst to the reactor during the startup period includes linear functions of the form, $$q_c = \beta \cdot t \qquad \text{Equation 1.15}$$

where $\beta$ is the rate of increase in the rate of introduction of catalyst to the reactor, and t is the time elapsed since the beginning of the startup period. If $t_s$ is the length of the startup period then, $$\beta = \frac{q_c^s}{t_s} \quad \text{Equation 1.16}$$

where $q_c^s$, as defined earlier, is the rate of introduction of catalyst to the reactor required to achieve the desired steady-state production rate and target split at the end of the startup period. Equation 1.15 and 1.16 can be substituted for $q_c$ in Equations 1.4 and 1.5, Equations 1.1–1.13 solved using different values of $t_s$ ($q_c^s$ is fixed), and the results ranked, for example by one of the two methods described above.

Additional description is provided by: Debling, J. A., G. C. Han, F. Kuijpers, J. VerBerg, J. Zacca, and W. H. Ray, "Dynamic Modeling of Product Grade Transitions of Olefin Polymerization Processes", *AIChE J.*, 40, 506–520 (1994); Hamielec, A. E., M. Osias, S. Ramanathan, A. Sirohi, and C. -C. Chen, "Polymer property distribution functions methodology and simulators", U.S. Pat. No. 6,093,211 (2000); Hutchinson, R. A. and W. H. Ray, "Polymerization of Olefins through Heterogeneous Catalysis. VIII. Monomer Sorption Effects", *J. Appl. Polym. Sci.*, 41, 51–81 (1990); McAuley, K. B. and J. F. MacGregor, "On-Line Inference of Polymer Properties in an Industrial Polyethylene Reactor", *AIChE J.*, 37, 825–835 (1991); McAuley, K. B. and J. F. MacGregor, "Optimal Grade Transitions in Gas Phase Polyethylene Reactors", *AIChE J.*, 38, 1564–1576 (1992); Takeda, M. and W. H. Ray, "Optimal-Grade Transition Strategies for Multistage Polyolefin Reactors", *AIChE J.*, 45, 1776–1793 (1999), and "POLYRED—Computer-Aided Polymerization Reactor Design", Users' Manual Version 5.0, *University of Wisconsin Polymerization Reaction Engineering Laboratory*, Madison, Wis. 1999, which are incorporated by reference herein.

Preferred chain transfer or termination agents include those well known in the art such hydrogen.

In preferred embodiments this invention is practiced in gas phase polymerization systems, slurry phase polymerization systems, and solution phase polymerization systems. In particular, this invention can be practiced in any continuous, well-mixed single-stage (single reactor) olefin polymerization process, including gas-phase fluidized bed reactors, gas-phase stirred-bed reactors, stirred-tank solution reactors, and slurry-loop reactors.

A multiphase reactor, such as a gas-phase fluidized bed reactor, gas-phase stirred-bed reactor, or slurry-loop reactor, is considered well mixed according to the following operational criteria: Choose a volume element, containing a large number of polymer particles, which is much smaller than the total volume of the reacting masses (volume of all phases, in the reactor). If the polymer particles in that volume element are considered in the aggregate and analyzed as a whole, and the distributions of composition, molecular weight and other polymer product characteristics are substantially the same for all volume elements containing polymer particles, the contents of the reactor are considered to be well-mixed. Likewise, in a preferred embodiment, the reactant concentrations and/or temperature within each phase are also substantially the same for all volume elements containing those phases. The same basic principal applies for solution phase reactors.

This invention will be particularly beneficial for the startup of dual catalyst systems comprising pairs of catalysts for which the ratio of deactivation rate constants, $k_d^A/k_d^B$ is not 1, preferably greater than 1 or less than 1, more preferably greater that 2 or less than 0.5, and most preferably greater than 5 or less than 0.2.

The length of the startup interval during which the rate of introduction of catalyst to the reactor is manipulated is preferably 1 to 10 times $\tau^s$; more preferably 2 to 8 times $\tau^s$; and most preferably 3–6 times $\tau^s$, where $\tau^s$ is the desired steady-state residence time at the target production rate.

Metal Catalyst Compounds

In the process of this invention useful catalyst compounds include the traditional bulky ligand metallocene catalyst compounds include half and full sandwich compounds having one or more bulky ligands bonded to at least one metal atom. Typical bulky ligand metallocene compounds are generally described as containing one or more bulky ligand (s) and one or more leaving group(s) bonded to at least one metal atom. In one preferred embodiment, at least one bulky ligands is η-bonded to the metal atom, most preferably $\eta^5$-bonded to the metal atom.

The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene catalyst compounds of the invention are represented by the formula:

$$L^A L^B M Q_n \quad \text{(I)}$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium.

The bulky ligands, $L^A$ and $L^B$, are open, acyclic or fused ring(s) or ring system(s) and are any ancillary ligand system, including unsubstituted or substituted, cyclopentadienyl ligands or cyclopentadienyl ligands, heteroatom substituted or heteroatom containing cyclopentadienyl ligands (or both). Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopenta-cyclododecene ligands, azenyl ligands, azulene ligands, pentalene ligands, phosphoyl ligands, phosphinimine (WO 99/40125 and WO 00/05236), aminomethylphosphine ligands (U.S. Pat. No. 6,034,240 and WO 99/46271), pyrrolyl ligands, pyrozolyl ligands, carbazolyl ligands, borabenzene ligands, B-diketiminate ligands (U.S. Pat. No. 6,034,258), fullerenes (U.S. Pat. No. 6,002,035) and the like, including hydrogenated versions thereof, for example tetrahydroindenyl ligands. In one embodiment, $L^A$ and $L^B$ may be any other ligand structure capable of η-bonding to M, preferably $\eta^3$-bonding to M and most preferably $\eta^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand.

Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl- carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like.

Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene catalyst compound to form a bulky ligand metallocene catalyst cation capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In one embodiment, the bulky ligand metallocene catalyst compounds of the invention include those of formula (I) where $L^A$ and $L^B$ are bridged to each other by at least one bridging group, A, such that the formula is represented by:

$$L^A A L^B M Q_n \qquad (II).$$

These bridged compounds represented by formula (II) are known as bridged, bulky ligand metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, sulfur, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si\ R'_2Si$, $R'_2Ge$, $R'P$, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of formula (II) have two or more bridging groups A (as described, for example, in EP 664 301 B1) or the bridge is heteroatomic (as described, for example, in U.S. Pat. No. 5,986,025).

In one embodiment, the bulky ligand metallocene catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547, 5,858,903, 5,859,158, 5,900,517, 5,939,503, 5,962,718, 5,965,078, 5,965,756, 5,965,757, 5,977,270, 5,977,392, 5,986,024, 5,986,025, 5,986,029, 5,990,033 and 5,990,331 and PCT publications WO 93/08221, WO 93/08199, WO 95/07140, WO 98/11144, WO 98/41530, WO 98/41529, WO 98/46650, WO 99/02540, WO 99/14221 and WO 98/50392 and European publications EP-A-0 578 838, EP-A-0 638 595, EP-B-0 513 380, EP-A1-0 816 372, EP-A2-0 839 834, EP-B1-0 632 819, EP-B1-0 739 361, EP-B1-0 748 821 and EP-B1-0 757 996, all of which are herein fully incorporated by reference.

In one embodiment, bulky ligand metallocene catalysts compounds useful in the invention include bridged heteroatom, mono-bulky ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene catalyst compound is represented by the formula:

$$L^C AJMQ_n \qquad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to $L^C$ and J; J is a heteroatom ancillary ligand; and A is a bridging group; Q is a univalent anionic ligand; and n is the integer 0,1 or 2. In formula (III) above, $L^C$, A and J form a fused ring system. In an embodiment, $L^C$ of formula (III) is as defined above for $L^A$, A, M and Q of formula (III) are as defined above in formula (I).

In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the bulky ligand type metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene catalyst compound is represented by the formula:

$$L^D MQ_2(YZ)X_n \qquad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, or phosphorus (or any combination thereof), preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these metallocene catalyst compounds are described in WO 96/33202, WO 96/34021, WO 97/17379, WO 98/22486 and WO 99/40095 (dicarbamoyl metal complexes) and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, new metallocene catalyst compounds are those complexes known as transition metal catalysts based on bidentate ligands containing pyridine or quinoline moieties, such as those described in U.S. application Ser. No. 09/103,620 filed Jun. 23, 1998, U.S. Pat. No. 6,103,657, which is herein incorporated by reference. In another embodiment, the bulky ligand metallocene catalyst compounds are those described in PCT publications WO 99/01481 and WO 98/42664, which are fully incorporated herein by reference.

In one embodiment, these new metallocene catalyst compound is represented by the formula:

$$((Z)XA_t(YJ))_q MQ_n \qquad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is within the scope of this invention, in one embodiment, that the new metallocene catalyst compounds include complexes of Ni$^{2+}$ and Pd$^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below. Other new metallocene catalysts include those nickel complexes described in WO 99/50313, which is incorporated herein by reference.

Also included as metallocene catalyst are those diimine based ligands of Group 8 to 10 metal compounds disclosed in PCT publications WO 96/23010 and WO 97/48735 and Gibson, et. al., Chem. Comm., pp. 849–850 (1998), all of which are herein incorporated by reference. Group 6 bulky ligand metallocene catalyst systems are described in U.S. Pat. No. 5,942,462, which is incorporated herein by reference.

Other metallocene catalysts are those Group 5 and 6 metal imido complexes described in EP-A2-0 816 384 and U.S. Pat. No. 5,851,945, which is incorporated herein by reference. In addition, metallocene catalysts include bridged bis(arylamido) Group 4 compounds described by D. H. McConville, et al., in Organometallics 1195, 14, 5478–5480, which is herein incorporated by reference. In addition, bridged bis(amido) catalyst compounds are described in WO 96/27439, which is herein incorporated by reference. Other metallocene catalysts are described as bis(hydroxy aromatic nitrogen ligands) in U.S. Pat. No. 5,852,146, which is incorporated herein by reference. Other metallocene catalysts containing one or more Group 15 atoms include those described in WO 98/46651, which is herein incorporated herein by reference. Still other metallocene catalysts include those multinuclear metallocene catalysts as described in WO 99/20665 and U.S. Pat. No. 6,010,794, and transition metal metaaracyle structures described in EP 0 969 101 A2, which are herein incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that in one embodiment, the bulky ligand metallocene catalysts of the invention described above include their structural or optical or enantiomeric isomers (meso and racemic isomers, for example see U.S. Pat. No. 5,852,143, incorporated herein by reference) and mixtures thereof. Useful catalyst compounds also include compounds represented by the formula:

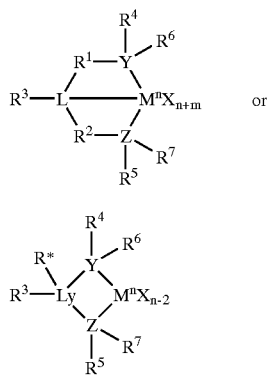

Formula A

Formula B wherein

M is a group 3–12 transition metal or a group 13 or 14 main group metal, preferably a group 4, 5, or 6 metal, preferably zirconium or hafnium, each X is independently an anionic leaving group, preferably hydrogen, a hydrocarbyl group, a heteroatom or a halogen, y is 0 or 1, n is the oxidation state of M, preferably +3, +4, or +5, preferably +4, m is the formal charge of the YZL ligand, preferably 0, −1, −2 or −3, preferably −2, L is a group 15 or 16 element, preferably nitrogen, Y is a group 15 element, preferably nitrogen or phosphorus, Z is a group 15 element, preferably nitrogen or phosphorus, $R^1$ and $R^2$ are independently a $C_1$ to $C_{20}$ hydrocarbon group, a heteroatom containing group having up to twenty carbon atoms, silicon, germanium, tin, lead, phosphorus, a halogen, preferably a $C_2$ to $C_6$ hydrocarbon group, preferably a $C_2$ to $C_{20}$ alkyl, aryl or aralkyl group, preferably a linear, branched or cyclic $C_2$ to $C_{20}$ alkyl group, $R^1$ and $R^2$ may also be interconnected to each other, $R^3$ is absent or a hydrocarbon group, hydrogen, a halogen, a heteroatom containing group, preferably a linear, cyclic or branched alkyl group having 1 to 20 carbon atoms, more preferably $R^3$ is absent or hydrogen, $R^4$ and $R^5$ are independently an aryl group, a substituted aryl group, a cyclic alkyl group, a substituted cyclic alkyl group, a cyclic aralkyl group, a substituted cyclic aralkyl group or multiple ring system, preferably having up to 20 carbon atoms, preferably between 3 and 10 carbon atoms, preferably a $C_1$ to $C_{20}$ hydrocarbon group, a $C_1$ to $C_{20}$ aryl group or a $C_1$ to $C_{20}$ aralkyl group, $R^6$ and $R^7$ are independently absent, or hydrogen, halogen, heteroatom or a hydrocarbyl group, preferably a linear, cyclic or branched alkyl group having 1 to 20 carbon atoms, more preferably absent, and $R^*$ is absent, or is hydrogen, a group 14 atom containing group, a halogen, a heteroatom containing group, provided that when L is a group 14 atom then $R^3$ and $R^*$ may not be absent.

An aralkyl group is defined to be a substituted aryl group.

In a preferred embodiment, L is bound to one of Y or Z and one of $R^1$ or $R^2$ is bound to L and not to Y or Z.

In an alternate embodiment $R^3$ and L do not form a heterocyclic ring.

In a preferred embodiment $R^4$ and $R^5$ are independently a group represented by the following formula:

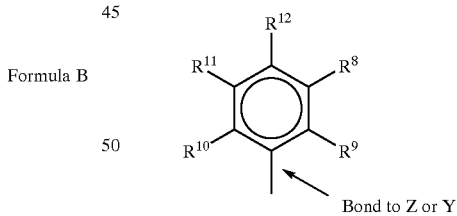

Bond to Z or Y wherein $R^8$ to $R^{12}$ are each independently hydrogen, a $C_1$ to $C_{40}$ alkyl group, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group or a heterocyclic group (or both). The cyclic groups may be aromatic. In a preferred embodiment $R^9$, $R^{10}$ and $R^{12}$ are independently a methyl, ethyl, propyl or butyl group, in a preferred embodiment $R^9$, $R^{10}$ and $R^{12}$ are methyl groups, and $R^8$ and $R^{11}$ are hydrogen.

In a particularly preferred embodiment $R^4$ and $R^5$ are both a group represented by the following formula:

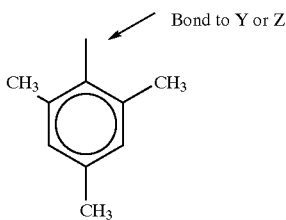

In this embodiment, M is preferably zirconium or hafnium, most preferably zirconium; each of L, Y, and Z is nitrogen; each of $R^1$ and $R^2$ is —$CH_2$—$CH_2$—; $R^3$ is hydrogen; and $R^6$ and $R^7$ are absent.

Preferred metal catalyst compounds include:
bis(cyclopentadienyl)titanium dimethyl,
bis(cyclopentadienyl)titanium diphenyl,
bis(cyclopentadienyl)zirconium dimethyl,
bis(cyclopentadienyl)zirconium diphenyl,
bis(cyclopentadienyl)hafnium methyl and diphenyl,
bis(cyclopentadienyl)titanium di-neopentyl,
bis(cyclopentadienyl)zirconium di-neopentyl,
bis(cyclopentadienyl)titanium dibenzyl,
bis(cyclopentadienyl)zirconium dibenzyl,
bis(cyclopentadienyl)vanadium dimethyl,
bis(cyclopentadienyl)titanium methyl chloride,
bis(cyclopentadienyl)titanium ethyl chloride,
bis(cyclopentadienyl)titanium phenyl chloride,
bis(cyclopentadienyl)zirconium methyl chloride,
bis(cyclopentadienyl)zirconium ethyl chloride,
bis(cyclopentadienyl)zirconium phenyl chloride,
bis(cyclopentadienyl)titanium methyl bromide,
cyclopentadienyl titanium trimethyl,
cyclopentadienyl zirconium triphenyl,
cyclopentadienyl zirconium trineopentyl,
cyclopentadienyl zirconium trimethyl,
cyclopentadienyl hafnium triphenyl,
cyclopentadienyl hafnium trineopentyl,
cyclopentadienyl hafnium trimethyl,
pentamethylcyclopentadienyl titanium trichloride,
pentaethylcyclopentadienyl titanium trichloride;
bis(indenyl)titanium diphenyl or dichloride,
bis(methylcyclopentadienyl)titanium diphenyl or dihalide,
bis(1,2-dimethylcyclopentadienyl)titanium diphenyl or dichloride,
bis(1,2-diethylcyclopentadienyl)titanium diphenyl or dichloride,
bis(pentamethylcyclopentadienyl) titanium diphenyl or dichloride;
dimethyl silyldicyclopentadienyl titanium diphenyl or dichloride,
methyl phosphine dicyclopentadienyl titanium diphenyl or dichloride,
methylenedicyclopentadienyl titanium diphenyl or dichloride,
isopropyl(cyclopentadienyl)(fluorenyl)zirconium dichloride,
isopropyl(cyclopentadienyl)(octahydrofluorenyl)zirconium dichloride,
diisopropylmethylene(cyclopentadienyl)(fluorenyl) zirconium dichloride,
diisobutylmethylene(cyclopentadienyl)(fluorenyl) zirconium dichloride,
ditertbutylmethylene(cyclopentadienyl)(fluorenyl) zirconium dichloride,
cyclohexylidene(cyclopentadienyl)(fluorenyl)zirconium dichloride,
diisopropylmethylene(2,5-dimethylcyclopentadienyl) (fluorenyl)zirconium dichloride,
isopropyl(cyclopentadienyl)(fluorenyl)hafnium dichloride,
diphenylmethylene(cyclopentadienyl)(fluorenyl)hafnium dichloride,
diisopropylmethylene(cyclopentadienyl)(fluorenyl)hafnium dichloride,
diisobutylmethylene(cyclopentadienyl)(fluorenyl)hafnium dichloride,
ditertbutylmethylene(cyclopentadienyl)(fluorenyl)hafnium dichloride,
cyclohexylidene(cyclopentadienyl)(fluorenyl)hafnium dichloride,
diisopropylmethylene(2,5-dimethylcyclopentadienyl) (fluorenyl)-hafnium dichloride,
isopropyl(cyclopentadienyl)(fluorenyl)titanium dichloride,
diphenylmethylene(cyclopentadienyl)(fluorenyl)titanium dichloride,
diisopropylmethylene(cyclopentadienyl)(fluorenyl)titanium dichloride,
diisobutylmethylene(cyclopentadienyl)(fluorenyl)titanium dichloride,
ditertbutylmethylene(cyclopentadienyl)(fluorenyl)titanium dichloride,
cyclohexylidene(cyclopentadienyl)(fluorenyl)titanium dichloride,
diisopropylmethylene(2,5 dimethylcyclopentadienyl fluorenyl)titanium dichloride,
racemic-ethylene bis(1-indenyl)zirconium (IV) dichloride,
racemic-ethylene bis (4,5,6,7-tetrahydro-1-indenyl) zirconium (IV) dichloride,
racemic-dimethylsilyl bis (1-indenyl) zirconium (IV) dichloride,
racemic-dimethylsilyl bis (4,5,6,7-tetrahydro-1-indenyl) zirconium (IV) dichloride,
racemic-1,1,2,2-tetramethylsilanylene bis (1-indenyl) zirconium (IV) dichloride,
racemic-1,1,2,2-tetramethylsilanylene bis (4,5,6,7-tetrahydro-1-indenyl) zirconium (IV) dichloride,
ethylidene (1-indenyl tetramethylcyclopentadienyl) zirconium (IV) dichloride,
racemic-dimethylsilyl bis (2-methyl-4-t-butyl-1-cyclopentadienyl) zirconium (IV) dichloride,
racemic-ethylene bis (1-indenyl) hafnimn (IV) dichloride,
racemic-ethylene bis (4,5,6,7-tetrahydro-1-indenyl) hafnium (IV) dichloride,
racemic-dimethylsilyl bis (1-indenyl) hafnium (IV) dichloride,
racemic-dimethylsilyl bis (4,5,6,7-tetrahydro-1-indenyl) hafnium (IV) dichloride,
racemic-1,1,2,2-tetramethylsilanylene bis (1-indenyl) hafnium (IV) dichloride,
racemic-1,1,2,2-tetramethylsilanylene bis (4,5,6,7-tetrahydro-1-indenyl) hafnium (IV), dichloride,
ethylidene (1-indenyl-2,3,4,5-tetramethyl-1-cyclopentadienyl) hafnium (IV) dichloride,
racemic-ethylene bis (1-indenyl) titanium (IV) dichloride,
racemic-ethylene bis (4,5,6,7-tetrahydro-1-indenyl) titanium (IV) dichloride,
racemic-dimethylsilyl bis (1-indenyl) titanium (IV) dichloride,
racemic-dimethylsilyl bis (4,5,6,7-tetrahydro-1-indenyl) titanium (IV) dichloride,
racemic-1,1,2,2-tetramethylsilanylene bis (1-indenyl) titanium (IV) dichloride, racemic-1,1,2,2-tetramethylsilanylene bis (4,5,6,7-tetrahydro-1-indenyl) titanium (IV) dichloride,
ethylidene (1-indenyl-2,3,4,5-tetramethyl-1-cyclopentadienyl) titanium (IV) dichloride,
indenyl zirconium tris(diethylcarbamate),
indenyl zirconium tris(pivalate),
indenyl zirconium tris(p-toluate),
indenyl zirconium tris(benzoate), (1-methylindenyl) zirconium tris(pivalate),
(2-methylindenyl) zirconium tris(diethylcarbamate), (methylcyclopentadienyl) zirconium tris(pivalate),
cyclopentadienyl tris(pivalate), and
(pentamethylcyclopentadienyl) zirconium tris(benzoate).

Additional preferred catalysts include: compounds represented by the formula: $[(2,4,6\text{-Me}_3\text{C}_6\text{H}_2)\text{NCH}_2\text{CH}_2]_2\text{NHMX}_2$, where M is a group 4 metal and each X is independently a halide or a benzyl group.

Activator and Activation Methods for the Metal Catalyst Compounds

The above described catalyst compounds are typically activated in various ways to yield catalyst systems having a vacant coordination site that will coordinate, insert, and polymerize olefin(s).

For the purposes of this patent specification and appended claims, the term "activator" is defined to be any compound or component or method that can activate any of the catalyst compounds of the invention described above. Non-limiting activators, for example may include a Lewis acid or a non-coordinating ionic activator or ionizing activator or any other compound including Lewis bases, aluminum alkyls, conventional cocatalysts and combinations thereof that can convert a neutral metallocene catalyst compound to a catalytically active bulky ligand metallocene cation. It is within the scope of this invention to use alumoxane or modified alumoxane as an activator, or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or any combination thereof, that would ionize the neutral metallocene catalyst compound.

In one embodiment, an activation method using ionizing ionic compounds not containing an active proton but capable of producing both a catalyst cation and a non-coordinating anion are also contemplated, and are described in EP-A-0 426 637, EP-A-0 573 403 and U.S. Pat. No. 5,387,568, which are all herein incorporated by reference. An aluminum based ionizing activator is described in U.S. Pat. No. 5,602,269 and boron and aluminum based ionizing activators are described in WO 99/06414, which are incorporated herein by reference, and are useful in this invention.

There are a variety of methods for preparing alumoxane and modified alumoxanes, non-limiting examples of which are described in U.S. Pat. No. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. A preferred alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

Organoaluminum compounds as activators include trimethylaluminum, triethylaluminum, triisobutylaluminum, tri-n-hexylaluminum, tri-n-octylaluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, now abandoned all of which are herein fully incorporated by reference.

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating metallocene catalyst compounds with perchlorates, periodates and iodates including their hydrates. WO 98/30602 and WO 98/30603 incorporated by reference describe the use of lithium (2,2'-bisphenyl-ditrimethylsilicate)·4THF as an activator for a metallocene catalyst compound. WO 99/18135 incorporated herein by reference describes the use of organo-boron-aluminum activators. EP-B1-0 781 299 describes using a silylium salt in combination with a non-coordinating compatible anion.

Also, methods of activation such as using radiation (see EP-B1-0 615 981 herein incorporated by reference), electrochemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in for example, U.S. Pat. Nos. 5,849,852, 5,859,653 and 5,869,723 and WO 98/32775, WO 99/42467 (dioctadecylmethyl-ammonium-bis(tris (pentafluorophenyl)borane)benzimidazolide), which are herein incorporated by reference.

It is also within the scope of this invention that the above described catalyst compounds can be combined with one or more of the catalyst compounds represented by formulas above with one or more activators or activation methods described above. Preferred activators include: methylalumoxane, modified methyl alumoxane, triisobutyl alumoxane, trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis (pentafluorophenyl)borate, triethylammonium tetrakis (pentafluorophenyl)borate, tripropylammonium tetrakis (pentafluorophenyl)borate, tri(n-butyl)ammonium tetrakis (pentafluorophenyl)borate, tri(sec-butyl)ammonium tetrakis (pentafluorophenyl) borate, N,N-dimethylanilinium tetrakis (pentafluorophenyl) borate, N,N-diethylanilinium tetrakis (pentafluorophenyl) borate, N,N-dimethyl-(2,4,6-trimethylanilinium) tetrakis(pentafluorophenyl) borate, trimethylammonium tetrakis-(2,3,4,6- tetrafluorophenylborate, triethylammonium tetrakis-(2,3,4, 6-tetrafluorophenyl) borate, tripropylammonium tetrakis-(2, 3,4,6-tetrafluorophenyl) borate, tri(n-butyl)ammonium tetrakis-(2,3,4,6-tetrafluoro-phenyl) borate, dimethyl(t-butyl)ammonium tetrakis-(2,3,4,6-tetrafluorophenyl) borate, N,N-dimethylanilinium tetrakis-(2,3,4,6-tetrafluorophenyl) borate, N,N-diethylanilinium tetrakis-(2,3,4,6-tetrafluorophenyl) borate, and N,N-dimethyl-(2,4,6-trimethylanilinium)tetrakis-(2,3,4,6-tetrafluorophenyl) borate, di-(i-propyl)ammonium tetrakis(pentafluorophenyl) borate, dicyclohexylammonium tetrakis(pentafluorophenyl) borate, triphenylphosphonium tetrakis(pentafluorophenyl) borate, tri(o-tolyl)phosphonium tetrakis(pentafluorophenyl) borate, and tri(2,6-dimethylphenyl)phosphonium tetrakis (pentafluorophenyl) borate.

Conventional-Type Transition Metal Catalysts

In another embodiment, conventional-type transition metal catalysts may be used in the practice of this invention. Conventional-type transition metal catalysts are those traditional Ziegler-Natta, vanadium and Phillips-type catalysts well known in the art. Such as, for example Ziegler-Natta catalysts as described in *Ziegler-Natta Catalysts and Polymerizations*, John Boor, Academic Press, New York, 1979. Examples of conventional-type transition metal catalysts are also discussed in U.S. Pat. Nos. 4,115,639, 4,077, 904, 4,482,687, 4,564,605, 4,721,763, 4,879,359 and 4,960, 741 all of which are herein fully incorporated by reference. The conventional-type transition metal catalyst compounds that may be used in the present invention include transition metal compounds from Groups 3 to 17, preferably 4 to 12, more preferably 4 to 6 of the Periodic Table of Elements.

These conventional-type transition metal catalysts may be represented by the formula: $MR_x$, where M is a metal from Groups 3 to 17, preferably Group 4 to 6, more preferably Group 4, most preferably titanium; R is a halogen or a hydrocarbyloxy group; and x is the oxidation state of the metal M. Non-limiting examples of R include alkoxy, phenoxy, bromide, chloride and fluoride. Non-limiting examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred.

British Patent Application 2,105,355 and U.S. Pat. No. 5,317,036, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu=butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, and naphthyl and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 3,709,853, 3,709,954, 3,231,550, 3,242,099 and 4,077,904, which are herein fully incorporated by reference.

Still other conventional-type transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436, which are all herein incorporated by reference.

Other catalysts may include cationic catalysts such as $AlCl_3$, and other cobalt, iron, nickel and palladium catalysts well known in the art. See for example U.S. Pat. Nos. 3,487,112, 4,472,559, 4,182,814 and 4,689,437 all of which are incorporated herein by reference.

Typically, these conventional-type transition metal catalyst compounds excluding some conventional-type chromium catalyst compounds are activated with one or more of the conventional-type cocatalysts described below.

Conventional-Type Cocatalysts

Conventional-type cocatalyst compounds for the above conventional-type transition metal catalyst compounds may be represented by the formula $M^3M^4_vX^2_cR^3_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum.

Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride.

Conventional-type organometallic cocatalyst compounds are known to those skilled in the art and a more complete discussion of these compounds may be found in U.S. Pat. Nos. 3,221,002 and 5,093,415, which are herein fully incorporated by reference.

Supports, Carriers and General Supporting Techniques

The above described catalyst compounds, activators or catalyst systems (or any combination thereof) may be combined with one or more support materials or carriers.

For example, in a most preferred embodiment, the activator is contacted with a support to form a supported activator wherein the activator is deposited on, contacted with, vaporized with, bonded to, or incorporated within, adsorbed or absorbed in, or on, a support or carrier.

Support materials of the invention include inorganic or organic support materials, preferably a porous support material. Non-limiting examples of inorganic support materials include inorganic oxides and inorganic chlorides. Other carriers include resinous support materials such as polystyrene, functionalized or crosslinked organic supports, such as polystyrene divinyl benzene, polyolefins or polymeric compounds, or any other organic or inorganic support material and the like, or mixtures thereof.

The preferred support materials are inorganic oxides that include Group 2, 3, 4, 5, 13 or 14 metal oxides. The preferred supports include silica, fumed silica, alumina (WO 99/60033), silica-alumina and mixtures thereof. Other useful supports include magnesia, titania, zirconia, magnesium chloride (U.S. Pat. No. 5,965,477), montmorillonite (EP-B1 0 511 665), phyllosilicate, zeolites, talc, clays (6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference. A preferred support is fumed silica available under the trade name Cabosil™ TS-610, available from Cabot Corporation. Fumed silica is typically a silica with particles 7 to 30 nanometers in size that has been treated with dimethylsilyldichloride such that a majority of hydroxyl groups are capped.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 $\mu$m. More preferably, the surface area of the support is in the range of from about 50 to about 500 $m^2/g$, pore volume of from about 0.5 to about 3.5 cc/g and average particle size of from about 10 to about 200 $\mu$m. Most preferably the surface area of the support is in the range from about 100 to about 1000 $m^2/g$, pore volume from about 0.8 to about 5.0 cc/g and average particle size is from about 5 to about 100 $\mu$m. The average pore size of the support material of the invention typically has pore size in the range of from 10 to 1000 Å, preferably 50 to about 500 Å, and most preferably 75 to about 450 Å.

There are various methods known in the art for producing a supported activator or combining an activator with a support material. In an embodiment, the support material is chemically treated or dehydrated (or both) prior to combining with the catalyst compound, activator or catalyst system or any combination thereof.

In one embodiment, an alumoxane is contacted with a support material, preferably a porous support material, more preferably a inorganic oxide, and most preferably the support material is silica.

In an embodiment, the support material having a various levels of dehydration, preferably 200° C. to 600° C. dehydrated silica, that is then contacted with an organoaluminum or alumoxane compound. In specifically the embodiment wherein an organoaluminum compound is used, the activator is formed in situ the support material as a result of the reaction of for example trimethylaluminum and water.

In yet another embodiment, a Lewis base-containing support substrates will react with a Lewis acidic activator to form a support bonded Lewis acid compound. The Lewis base hydroxyl groups of silica are exemplary of metal/metalloid oxides where this method of bonding to a support occurs. This embodiment is described in U.S. patent application Ser. No. 09/191,922, filed Nov. 13, 1998, U.S. Pat. No. 6,147,173, which is herein incorporated by reference.

Other embodiments of supporting an activator are described in U.S. Pat. No. 5,427,991, where supported non-coordinating anions derived from trisperfluorophenyl boron are described; U.S. Pat. No. 5,643,847 discusses the reaction of Group 13 Lewis acid compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions; immobilized Group IIIA Lewis acid catalysts suitable for carbocationic polymerizations are described in U.S. Pat. No. 5,288,677; and James C. W. Chien, Jour. Poly. Sci.: Pt A: Poly. Chem, Vol. 29, 1603–1607 (1991), describes the olefin polymerization utility of methylalumoxane (MAO) reacted with silica ($SiO_2$) and metallocenes and describes a covalent bonding of the aluminum atom to the silica through an oxygen atom in the surface hydroxyl groups of the silica.

In one embodiment, the supported activator is commercially available from Witco.

In the preferred embodiment, the supported activator is formed by preparing in an agitated, and temperature and pressure controlled vessel a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 5 psia to 20 psia (34.5 to 138kPa). An inert gas sweep can also be used in assist in removing solvent. Alternate orders of addition, such as slurrying the support material in an appropriate solvent then adding the activator, can be used In an embodiment, the weight percent of the activator to the support material is in the range of from about 10 weight percent to about 70 weight percent, preferably in the range of from 20 weight percent to about 60 weight percent, more preferably in the range of from about 30 weight percent to about 50 weight percent, and most preferably in the range of from 30 weight percent to about 40 weight percent.

The catalyst compounds, activators and catalyst systems may be introduced into the reactors as dry powders, liquids, solutions, suspensions, emulsions and slurries. A slurry used in the process of this invention is typically prepared by suspending the activator catalyst compound (or both) in a liquid diluent. The liquid diluent is typically an alkane having from 3 to 7 carbon atoms, preferably a branched alkane or an organic composition such as mineral oil. The diluent employed should be liquid under the conditions of polymerization and relatively inert. The concentration of the components in the slurry is controlled such that a desired ratio of catalyst compound(s) to activator, or catalyst compound to catalyst compound (or both) is fed into the reactor. The components are generally fed into the polymerization reactor as a mineral oil slurry. Solids concentrations in oil are about 10–15 weight %, preferably 11–14 weight %. In some embodiments, the spray dried particles are <~10 micrometers in size from the lab-scale Buchi spray-dryer, while the scaled up rotary atomizers can create particles ~25 micrometers, compared to conventional supported catalysts which are ~50 micrometers. In a preferred embodiment the particulate filler has an average particle size of 0.001 to 1 microns, preferably 0.001 to 0.1 microns.

A solution used in the process of this invention is typically prepared by dissolving the activator or catalyst compound (or both) in a liquid solvent. The solution employed should be liquid under the conditions of polymerization and relatively inert. The concentration of the components in the solution is controlled such that a desired ratio of catalyst compound(s) to activator, or catalyst compound to catalyst compound (or both) is fed into the reactor. In some embodiments preferred slurries comprise a supported activator in other embodiments preferred slurries comprise one or more supported or unsupported catalyst compounds represented by the formulas A and B.

Spray Drying

In a particularly preferred embodiment, the one r more catalyst compounds has been optionally combined with an activator or support material (or both), and spray dried prior to being combined with the slurry diluent. The metal compounds or the activators (or both) are then preferably combined with a support material such as a particulate filler material and then spray dried, preferably to form a free flowing powder. Spray drying may be by any means known in the art. Please see EPA 0 668 295 B1, U.S. Pat. No. 5,674,795 and U.S. Pat. No. 5,672,669 which particularly describe spray drying of supported catalysts.

In general one may spray dry the catalysts by placing the catalyst compound and the optional activator in solution (allowing the catalyst compound and activator to react, if desired), adding a filler material such as silica or Cabosil™, and then forcing the solution at high pressures through a nozzle. The solution may be sprayed onto a surface or sprayed such that the droplets dry in midair. The method generally employed is to disperse the silica in toluene, stir in the activator solution, and then stir in the catalyst compound solution. Typical slurry concentrations are about 5–8 wt %. This formulation may sit as a slurry for as long as 30 minutes with mild stirring or manual shaking to keep it as a suspension before spray-drying. In one preferred embodiment, the makeup of the dried material is about 40–50 wt % activator, (preferably alumoxane), 50–60 $SiO_2$ and about ~2 wt % catalyst compound.

For simple catalyst compound mixtures, the two or more catalyst compounds can be added together in the desired ratio in the last step. In another embodiment, more complex procedures are possible, such as addition of a first catalyst compound to the activator/filler mixture for a specified reaction time t, followed by the addition of the second catalyst compound solution, mixed for another specified time x, after which the mixture is co-sprayed. Lastly, another additive, such as 1-hexene in about 10 vol % can be present in the activator/filler mixture prior to the addition of the first metal catalyst compound.

In another embodiment a solution of a bulky ligand metallocene type compound and optional activator can be combined with the slurried spray dried catalysts of this invention and then introduced into a reactor.

In another embodiment binders are added to the mix. These can be added as a means of improving the particle morphology, i.e. narrowing the particle size distribution, lower porosity of the particles and allowing for a reduced quantity of alumoxane, which is acting as the 'binder'.

The spray-dried particles are generally fed into the polymerization reactor as a mineral oil slurry. Solids concentrations in oil are about 10–15 weight %, preferably 11–14 weight %. In some embodiments, the spray dried particles are <~10 micrometers in size from the lab-scale Buchi spray-dryer, while the scaled up rotary atomizers can create particles ~25 micrometers, compared to conventional supported catalysts which are ~50 micrometers. In a preferred embodiment the support has an average particle size of 0.001 to 1 microns, preferably 0.001 to 0.1 microns.

In a preferred embodiment, the catalyst metal compounds are based upon the same metal, preferably a group 4 metal, preferably Zr, Hf or Ti, preferably Zr.

The catalysts/activators/catalyst systems can be combined in situ or before being placed in the polymerization reactor. Further one metal compound can be activated and the other metal compound just added to the already activated polymerization mixture. Likewise one or more of the catalyst systems may be supported on an organic or inorganic support. Typical supports include silica, clay, talc magnesium chloride and the like. The metal compounds with or without the activator may be placed on separate supports or may be placed on the same support. Likewise the activator may be placed on the same support as the metal compound or may be placed on a separate support. The metal compounds/catalyst systems or their components (or any combination thereof) need not be fed into the reactor in the same manner. For example, one metal compound or its components may slurried into the reactor on a support while the other metal compound or its components are provided in a solution.

Generally, the first and second metal catalyst compounds may be combined at molar ratios of 1:1000 to 1000:1, preferably 1:99 to 99:1, preferably 10:90 to 90:10, more preferably 20:80 to 80:20, more preferably 30:70 to 70:30, more preferably 40:60 to 60:40. The particular ratio chosen will depend on the end product desired or the method of activation (or both). One practical method to determine which ratio is best to obtain the desired polymer is to start with a 1:1 ratio, measure the desired property in the product produced and adjust the ratio accordingly.

In a preferred embodiment the hydrogen concentration in the reactor is about 200–2000 ppm, preferably 250–1900 ppm, preferably 300–1800 ppm, preferably 350–1700 ppm, preferably 400–1600 ppm, preferably 500–1500 ppm, preferably 500–1400 ppm, preferably 500–1200 ppm, preferably 600–1200 ppm, preferably 700–1100 ppm, more preferably 800–1000 ppm.

In another embodiment the first metal compound is selected because when used alone it produces a high weight average molecular weight polymer (such as for example above 100,000, preferably above 150,000, preferably above 200,000, preferably above 250,000, more preferably above 300,000) and the second metal compound is selected because when used alone it produces a low molecular weight polymer (such as for example below 80,000, preferably below 70,000, preferably below 60,000, more preferably below 50,000, more preferably below 40,000, more preferably below 30,000, more preferably below 20,000 and above 5,000, more preferably below 20,000 and above 10,000).

In general the combined metal compounds and the activator are combined in ratios of about 1000:1 to about 0.5:1. In a preferred embodiment, the metal compounds and the activator are combined in a ratio of about 300:1 to about 1:1, preferably about 150:1 to about 1:1, for boranes, borates, and aluminates, the ratio is preferably about 1:1 to about 10:1 and for alkyl aluminum compounds (such as diethyl aluminum chloride combined with water) the ratio is preferably about 0.5:1 to about 10:1.

Polymerization Process of the Invention

In one embodiment, this invention is directed toward solution, slurry or gas phase polymerization reactions involving the polymerization of one or more of monomers having from 2 to 30 carbon atoms, preferably 2–12 carbon atoms, and more preferably 2 to 8 carbon atoms. Preferred monomers include one or more of ethylene, propylene, butene-1, pentene-1, 4-methyl-pentene-1, hexene-1, octene-1, decene-1, 3-methyl-pentene-1, 4-methyl pentene-1, and cyclic olefins or a combination thereof. Other monomers can include vinyl monomers, diolefins such as dienes, polyenes, norbornene, and norbornadiene monomers. Preferably a homopolymer of ethylene is produced. In another embodiment, a copolymer of ethylene and one or more of the monomers listed above is produced.

In another embodiment ethylene or propylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, propylene/ethylene/hexene-1, ethylene/propylene/norbornene and the like.

In a particularly preferred embodiment, the process of the invention relates to the polymerization of ethylene and at least one comonomer having from 4 to 8 carbon atoms, preferably 4 to 7 carbon atoms. Particularly, the comonomers are butene-1, 4-methyl-pentene-1, 3-methyl-pentene-1, hexene-1 and octene-1, the most preferred being hexene-1.

Typically, in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.

The reactor pressure in a gas phase process may vary from about 10 psig (69 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 75° C. to about 110° C., and most preferably in the range of from about 85° C. to about 105° C.

The productivity of the catalyst or catalyst system in a gas phase system is influenced by the main monomer partial pressure. The preferred mole percent of the main monomer, ethylene or propylene, preferably ethylene, is from about 25 to 90 mole percent and the monomer partial pressure is in the range of from about 75 psia (517 kPa) to about 300 psia (2069 kPa), which are typical conditions in a gas phase polymerization process.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421 all of which are herein fully incorporated by reference.

In a preferred embodiment the bed in the phase polymerization reactor is charged with a bed of the same product that the polymerization process is to produce.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process is operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179, which is fully incorporated herein by reference. The preferred temperature in the particle form process is within the range of about 185° F. (85° C.) to about 230° F. (110° C.). Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst as a slurry in isobutane or as a dry free flowing powder is injected regularly to the reactor loop, which is itself filled with circulating slurry of growing polymer particles in a diluent of isobutane containing monomer and comonomer. Hydrogen, optionally, may be added as a molecular weight control. The reactor is maintained at pressure of about 525 psig to 625 psig (3620 kPa to 4309 kPa) and at a temperature in the range of about 140° F. to about 220° F. (about 60° C. to about 104° C.) depending on the desired polymer density. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of ethylene in the reactor liquid medium is in the range of from about 1 to 10 weight percent, preferably from about 2 to about 7 weight percent, more preferably from about 2.5 to about 6 weight percent, most preferably from about 3 to about 6 weight percent.

A preferred process of the invention is where the process, preferably a slurry or gas phase process is operated in the absence of or essentially free of any scavengers, such as triethylaluminum, trimethylaluminum, tri-isobutyl aluminum and tri-n-hexylaluminum and diethyl aluminum chloride, dibutyl zinc and the like. This preferred process is described in PCT publication WO 96/08520 and U.S. Pat. No. 5,712,352, which are herein fully incorporated by reference.

In another preferred embodiment the one or more of the supported catalysts are combined with up to 10 weight % of a metal stearate, (preferably an aluminum stearate, more preferably aluminum distearate) based upon the weight of the catalyst, any support and the stearate, preferably 2 to 6 weight %. In an alternate embodiment a solution or slurry of the metal stearate is fed into the reactor. These agents may be dry tumbled with the supported catalyst or may be fed into the reactor in a solution or slurry with or without the catalyst system or its components. In a preferred embodiment the stearate is fed into the reactor as slurry in mineral oil, preferably at about 10 weight %.

More description regarding the use of aluminum stearate type additives may be found in U.S. Ser. No. 09/113,261, filed Jul. 10, 1998, U.S. Pat. No. 6,031,120, which is incorporated by reference herein.

The molecular weight of the polymer produced (and other properties) may be changed by manipulating the polymerization system by:

1) changing the amount of the first catalyst in the polymerization system; or
2) changing the amount of the second catalyst in the polymerization system; or
3) changing the amount of hydrogen present in the polymerization process; or
4) changing the amount of liquid or gas (or both) that is withdrawn or purged (or both) from the process; or
5) changing the amount or composition (or both) of a recovered liquid or recovered gas (or both) returned to the polymerization process, said recovered liquid or recovered gas being recovered from polymer discharged from the polymerization process; or
6) using a hydrogenation catalyst in the polymerization process; or
7) changing the polymerization temperature; or
8) changing the ethylene partial pressure in the polymerization process; or
9) changing the ethylene to comonomer ratio in the polymerization process; or
10) changing the activator to transition metal ratio in the activation sequence; or
11) changing the comonomer; or
12) changing the catalyst activation sequence, or any combination thereof.

In a preferred embodiment, the polyolefin recovered typically has a melt index as measured by ASTM D-1238, Condition E, at 190° C. of 10 g/10 min or less, preferably 1 g/10 min or less, preferably between 0.01 and 0.5 g/10 min. In a preferred embodiment the polyolefin is ethylene homopolymer or copolymer. The comonomer is preferably a $C_3$ to $C_{20}$ linear branched or cyclic monomer, and in one embodiment is a $C_3$ to $C_{12}$ linear or branched alpha-olefin, preferably propylene, hexene, pentene, hexene, heptene, octene, nonene, decene, dodecene, 4-methyl-pentene-1, 3-methyl pentene-1, 3,5,5-trimethyl hexene 1, and the like.

In a preferred embodiment, the method described above is used to make polyolefins. In a particularly preferred embodiment the method described above is used to make a polyethylene having a density of between 0.89 and 0.970 g/cm$^3$ (as measured by ASTM 2839), and preferably a melt index of 100 g/10 min or less (as measured by ASTM D-1238, Condition E, at 190° C.).

The polyolefins then can be made into films, molded articles, pipes, wire and cable coating, sheets and the like. The films may be formed by any of the conventional technique known in the art including extrusion, co-extrusion, lamination, blowing and casting. The film may be obtained by the flat film or tubular process that may be followed by orientation in a uniaxial direction or in two mutually perpendicular directions in the plane of the film to the same or different extents. Particularly preferred methods to form the polymers into films include extrusion or coextrusion on a blown or cast film line.

The films produced may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, BaSO$_4$, diatomaceous earth, wax, carbon black, flame retarding additives, low molecular weight resins, glass beads and the like. The additives may be present in the typically effective amounts well known in the art, such as 0.001 weight % to 10 weight %.

EXAMPLES

In the following examples, $O^A$ and $O^B$ are both equal to 1.

Catalyst A is [(2,4,6-Me$_3$C$_6$H$_2$)NCH$_2$CH$_2$]$_2$NHZrBz$_2$ (where Me is methyl and Bz is benzyl). Catalyst B is indenyl zirconium tris pivalate.

A gas-phase fluidized bed reactor with a nominal 200 liter reaction zone is charged with 120 lbs of high molecular weight, high density bimodal ethylene-1-hexene copolymer. This charging powder is composed of the same copolymer to be produced, which has a density of 0.948 g/cc, a weight average molecular weight of 320,000, a polydispersity ($M_w/M_n$) of 26, and consists of 50 weight percent high molecular weight copolymer produced by catalyst A, and 50 weight percent low molecular weight copolymer produced by catalyst B. It is desired to maintain at all times the weight fraction of high molecular weight copolymer in the product within the interval 0.49–0.51, with a target of 0.50.

The reactor is purged with nitrogen, then filled with a gas mixture comprising ethylene, 1-hexene, hydrogen, and nitrogen to a total pressure of 350 psi (2.4 MPa), the partial pressure of ethylene being 220 psi (1.5 MPa), the ratios of the partial pressure of 1-hexene to the partial pressure of ethylene and the partial pressure of hydrogen to the partial pressure of ethylene being equal to 0.005 and 0.0013, respectively, and kept constant throughout start up and beyond. A fluidization gas velocity of 1.65 feet per second (0.5 m/sec) is established and the temperature of the fluidized bed is set to 85° C. Start up is initiated by introducing catalyst into the reactor. With the exception of the pressures and ratios described above, gas composition in the reactor may change with time due to introduction of inert hydrocarbons that may be used to carry catalyst into the reactor.

Example 1 illustrates the prior art in which catalyst is introduced for the entire start up period at a constant rate of 3.4 gms/hr, which rate is sufficient to achieve the desired final production rate of 30 lbs/hr and residence time of 4 hrs. Product is discharged intermittently in such a manner during startup and beyond so as to maintain a substantially constant bed weight of 120 lbs. Surprisingly, in spite of using a charging powder composed of the same copolymer to be produced, FIG. 1 shows that the weight fraction of polymer produced by catalyst A in product discharged from the reactor increases quickly to values exceeding the upper specification limit for this variable by a substantial margin for a period exceeding 9 hrs.

The dual catalyst system of this example has a productivity of 4,000 gm-PE/gm-catalyst at the desired final production rate of 30 lbs/hr and residence time of 4 hrs. Catalyst A, which has a half-life of 20 minutes comprises 67 mole percent of the dual catalyst, while catalyst B, which has a half-life of 2 hrs, comprises 33 mole percent of the dual catalyst. The total catalyst loading is ~4.3×10$^{-5}$ moles-metal/gm-catalyst. Because the copolymer of this example is a high density polyethylene containing less than 0.5 mole percent 1-hexene, a value of 28.013 gms/mol can be reasonably used for $\overline{m_{M_1}^A}$ and $\overline{m_{M_1}^B}$. The deactivation rate constants, $k_d^A$ and $k_d^B$, for catalysts A and B (determined from their half-lives) are 5.78×10$^{-4}$ sec$^{-1}$ and 9.63×10$^{-5}$ sec$^{-1}$, respectively. $M_1$, which has the value 2.929×10$^{-4}$ mol/cm$^3$ at an ethylene partial pressure of 220 psi (1.5 MPa) and 85° C., has been estimated using Stern's correlation and Henry's Law. The values used for $k_{p1}^A$ and $k_{p1}^B$, 5.398×10$^6$ cm$^3$·mol$^{-1}$·sec$^{-1}$ and 2.765×10$^6$ cm$^3$·mol$^{-1}$·sec$^{-1}$, respectively, have been estimated from steady-state pilot plant production rate data, assuming $O^A=O^B=1$, using methods well known in the art.

The results shown in FIG. 1 for both Example 1 and 2 are obtained from dynamic calculations performed using the software program POLYRED 5.0. The results can also be obtained by solving Equations 1.1–1.13 using numerical methods well known in the art.

Example 2 illustrates the present invention in which the linear parametric function of Equations 1.15 and 1.16 is used to determine a favorable trajectory for the rate of introduction of catalyst into the reactor during start up. Multiple dynamic calculations are performed with different values of $t_s$ and the results evaluated; when a value of 24 hours is used, corresponding to a rate of increase in the rate of introduction of catalyst to the reactor during the start up period of 0.142 gms/hr/hr, using the dual catalyst system of Example 1, the desired final rate of production is substantially achieved within 24 hrs, and as shown in FIG. 1, the weight fraction of polymer produced by catalyst A in product discharged from the reactor remains at all times within the desired specification limits during the start up period.

In Examples 1 and 2, catalyst rate constants were extracted from pilot plant data and used in the construction of the feed rate trajectory. This data was obtained from a series of pilot-scale runs in which the example dual catalyst system was introduced into a fluidized bed reactor as a solution using methods known to the art. The data used for estimating the catalyst rate constants of this example include total reactor production rate, bed weight, residence time, reactor temperature, and monomer partial pressure, all obtained during steady-state reactor operation; data on the steady-state Zr metal content of polymer product, data on product split as determined by SEC, and data on the molar composition of the dual catalyst solution being fed to the reactor were also used. The half-lives of catalyst A and B are consensus values based on experience and data obtained on production rate loss during periods in which the introduction of catalyst to the reactor was interrupted. When performing standard experiments to determine catalyst rate constants, it does not matter which of the well-known methods in the art is used to calculate the rate constants, as long as the same method is applied consistently for all catalysts concerned. For Examples 1 and 2 the total catalyst productivity (in gm-PE/cm$^3$-catalyst) of the dual catalyst system solution used in the pilot plant experiments was converted to an arbitrary value of 4000 gm-PE/gm-catalyst and the catalyst loading (in mol-metal/gm-catalyst) adjusted so that the moles per minute of catalyst A and B introduced into the reactor are the same in both the Examples and the pilot plant experiments under steady-state conditions. This conversion was made solely to simplify presentation of the Examples, and has no material impact on the results.

As is apparent from the foregoing general description and the specific embodiments, while certain forms of the invention have been illustrated and described, various modifications can be made without departing from the spirit and scope of the invention. Accordingly, it is not intended that the invention be limited by or to those certain forms that have been illustrated and described.

I claim:

1. A method to start up an olefin polymerization process comprising:
   a. calculating a trajectory, from elements including catalyst deactivation rate constants ($k_d$), for the rate of introduction of a catalyst system, into a reactor, said catalyst system comprising two different metal catalyst compounds (A and B) and at least one activator, wherein the ratio of the deactivation constants of the two different metal catalyst compounds $k_d^A/k_d^B$ is not 1; and
   b. introducing olefin monomer, a catalyst system, optional co-monomer, and optional chain transfer or termination agents into a polymerization reactor in a manner such that the catalyst system introduction rate is manipulated to follow the trajectory until a desired production rate is achieved.

2. The method of claim 1 wherein the $k_d^A/k_d^B$ is less than 1.

3. The method of claim 1 wherein the $k_d^A/k_d^B$ is less than 0.5.

4. The method of claim 1 wherein the $k_d^A/k_d^B$ is greater than 1.

5. The method of claim 1 wherein the $k_d^A/k_d^B$ is greater than 2.

6. The method of claim 1 wherein the length of the startup interval during which the rate of introduction of catalyst to the reactor is manipulated is 1 to 10 times $\tau^s$; where $\tau^s$ is a desired steady-state residence time at a target production rate.

7. The method of claim 1 wherein the length of the startup interval during which the rate of introduction of catalyst to the reactor is manipulated is 3 to 6 times $\tau^s$; where $\tau^s$ is a desired steady-state residence time at a target production rate.

8. The method of claim 1 wherein the ratio of the chain termination agent to the monomer remains substantially constant during the start-up.

9. The method of claim 1 wherein the temperature and pressure in the reactor remain substantially constant.

10. The method of claim 1 wherein the monomer partial pressure in the reactor remains substantially constant.

11. The method of claim 1 wherein the chain termination agent is present and comprises hydrogen.

12. The method of claim 1 wherein comonomer is present.

13. The method of claim 12 where in the ratio of the monomer to co-monomer remains substantially constant during the polymerization.

14. The method of claim 12 wherein the chain termination agent is present and comprises hydrogen.

15. The method of claim 1 wherein the catalyst system comprises at least one metal catalyst compound selected from the group consisting of:

bis(cyclopentadienyl)titanium dimethyl,
bis(cyclopentadienyl)titanium diphenyl,
bis(cyclopentadienyl)zirconium dimethyl,
bis(cyclopentadienyl)zirconium diphenyl,
bis(cyclopentadienyl)hafnium methyl and diphenyl,
bis(cyclopentadienyl)titanium di-neopentyl,
bis(cyclopentadienyl)zirconium di-neopentyl,
bis(cyclopentadienyl)titanium dibenzyl,
bis(cyclopentadienyl)zirconium dibenzyl,
bis(cyclopentadienyl)vanadium dimethyl,
bis(cyclopentadienyl)titanium methyl chloride,
bis(cyclopentadienyl)titanium ethyl chloride,
bis(cyclopentadienyl)titanium phenyl chloride,
bis(cyclopentadienyl)zirconium methyl chloride,
bis(cyclopentadienyl)zirconium ethyl chloride,
bis(cyclopentadienyl)zirconium phenyl chloride,
bis(cyclopentadienyl)titanium methyl bromide,
cyclopentadienyl titanium trimethyl,
cyclopentadienyl zirconium triphenyl,
cyclopentadienyl zirconium trineopentyl,
cyclopentadienyl zirconium trimethyl,
cyclopentadienyl hafnium triphenyl,
cyclopentadienyl hafnium trineopentyl,
cyclopentadienyl hafnium trimethyl,
pentamethylcyclopentadienyl titanium trichloride,
pentaethylcyclopentadienyl titanium trichloride;
bis(indenyl)titanium diphenyl or dichloride,
bis(methylcyclopentadienyl)titanium diphenyl or dihalide,
bis(1,2-dimethylcyclopentadienyl)titanium diphenyl or dichloride,
bis(1,2-diethylcyclopentadienyl)titanium diphenyl or dichloride,
bis(pentamethylcyclopentadienyl) titanium diphenyl or dichloride;
dimethyl silyldicyclopentadienyl titanium diphenyl or dichloride,
methyl phosphine dicyclopentadienyl titanium diphenyl or dichloride,
methylenedicyclopentadienyl titanium diphenyl or dichloride,
isopropyl(cyclopentadienyl)(fluorenyl)zirconium dichloride,
isopropyl(cyclopentadienyl)(octahydrofluorenyl) zirconium dichloride,
diisopropylmethylene(cyclopentadienyl)(fluorenyl) zirconium dichloride,
diisobutylmethylene(cyclopentadienyl)(fluorenyl) zirconium dichloride,
ditertbutylmethylene(cyclopentadienyl)(fluorenyl) zirconium dichloride,
cyclohexylidene(cyclopentadienyl)(fluorenyl)zirconium dichloride,
disopropylmethylene(2,5-dimethylcyclopentadienyl) (fluorenyl)zirconium dichloride,
isopropyl(cyclopentadienyl)(fluorenyl)hafnium dichloride,
diphenylmethylene(cyclopentadienyl)(fluorenyl)hafnium dichloride,
diisopropylmethylene(cyclopentadienyl)(fluorenyl) hafnium dichloride,
diisobutylmethylene(cyclopentadienyl)(fluorenyl) hafnium dichloride,
ditertbutylmethylene(cyclopentadienyl)(fluorenyl) hafnium dichloride,
cyclohexylidene(cyclopentadienyl)(fluorenyl)hafnium dichloride,
diisopropylmethylene(2,5-dimethylcyclopentadienyl) (fluorenyl)-hafnium dichloride,
isopropyl(cyclopentadienyl)(fluorenyl)titanium dichloride,
diphenylmethylene(cyclopentadienyl)(fluorenyl)titanium dichloride,
diisopropylmethylene(cyclopentadienyl)(fluorenyl) titanium dichloride,
diisobutylmethylene(cyclopentadienyl)(fluorenyl) titanium dichloride,
ditertbutylmethylene(cyclopentadienyl)(fluorenyl) titanium dichloride,
cyclohexylidene(cyclopentadienyl)(fluorenyl)titanium dichloride,
diisopropylmethylene(2,5 dimethylcyclopentadienyl fluorenyl)titanium dichloride,
racemic-ethylene bis(1-indenyl)zirconium (IV) dichloride,
racemic-ethylene bis (4,5,6,7-tetrahydro-1-indenyl) zirconium (IV) dichloride, racemic-dimethylsilyl bis (1-indenyl) zirconium (IV) dichloride,
racemic-dimethylsilyl bis (4,5,6,7-tetrahydro-1-indenyl) zirconium (IV) dichloride,
racemic-1,1,2,2-tetramethylsilanylene bis (1-indenyl) zirconium (IV) dichloride,
racemic-1,1,2,2-tetramethylsilanylene bis (4,5,6,7-tetrahydro-1-indenyl) zirconium (IV) dichloride,
ethylidene (1-indenyl tetramethylcyclopentadienyl) zirconium (IV) dichloride,
racemic-dimethylsilyl bis (2-methyl-4-t-butyl-1-cyclopentadienyl) zirconium (IV) dichloride,
racemic-ethylene bis (1-indenyl) halfaium (IV) dichloride, racemic-ethylene
bis (4,5,6,7-tetrahydro-1-indenyl) halfaium (IV) dichloride,
racemic-dimethylsilyl bis (1-indenyl) hafnium (IV) dichloride,
racemic-dimethylsilyl bis (4,5,6,7-tetrahydro-1-indenyl) hafnium (IV) dichloride,
racemic-1,1,2,2-tetramethylsilanylene bis (1-indenyl) hafnium (IV) dichloride,
racemic-1,1,2,2-tetramethylsilanylene bis (4,5,6,7-tetrahydro-1-indenyl) hafnium (IV), dichloride,
ethylidene (1-indenyl-2,3,4,5-tetramethyl-1-cyclopentadienyl) hafnium (IV) dichloride,
racemic-ethylene bis (1-indenyl) titanium (IV) dichloride,
racemic-ethylene bis (4,5,6,7-tetrahydro-1-indenyl) titanium (IV) dichloride,
racemic-dimethylsilyl bis (1-indenyl) titanium (IV) dichloride,
racemic-dimethylsilyl bis (4,5,6,7-tetrahydro-1-indenyl) titanium (IV) dichloride,
racemic-1,1,2,2-tetramethylsilanylene bis (1-indenyl) titanium (IV) dichloride
racemic-1,1,2,2-tetramethylsilanylene bis (4,5,6,7-tetrahydro-1-indenyl) titanium (IV) dichloride,
ethylidene (1-indenyl-2,3,4,5-tetramethyl-1-cyclopentadienyl) titanium (IV) dichloride,
indenyl zirconium tris(diethylcarbamate),
indenyl zirconium tris(pivalate),
indenyl zirconium tris(p-toluate),
indenyl zirconium tris(benzoate), (1-methylindenyl) zirconium tris(pivalate),
(2-methylindenyl) zirconium tris(diethylcarbamate), (methylcyclopentadienyl) zirconium tris(pivalate),
cyclopentadienyl tris(pivalate),
(pentamethylcyclopentadienyl) zirconium tris(benzoate), and compounds represented by the formula:
[(2,4,6-Me$_3$C$_6$H$_2$)NCH$_2$CH$_2$]$_2$NHMX$_2$, where M is a group 4 metal and each X is independently a halide or a benzyl group.

16. The method of claim 1 wherein the catalyst system comprises at least one activator selected from the group consisting of:
methylalumoxane,
modified methyl alumoxane,
tirisobutyl alumoxane,
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) (tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate,
N,N-dimethyl-(2,4,6-trimethylanilinium) tetrakis (pentafluorophenyl) borate,
trimethylammonium tetrakis-(2,3,4,6-tetrafluorophenylborate,
triethylammonium tetrakis-(2,3,4,6-tetrafluorophenyl) borate,
tripropylammonium tetrakis-(2,3,4,6-tetrafluorophenyl) borate,
tri(n-butyl)ammonium tetrakis-(2,3,4,6-tetrafluorophenyl) borate,
dimethyl(t-butyl)ammonium tetrakis-(2,3,4,6-tetrafluorophenyl) borate,
N,N-dimethylanilinium tetrakis-(2,3,4,6-tetrafluorophenyl) borate,
N,N-diethylanilinium tetrakis-(2,3,4,6-tetrafluorophenyl) borate, and
N,N-dimethyl-(2,4,6-trimethylanilinium)tetrakis-(2,3,4,6-tetrafluorophenyl) borate,
di-(i-propyl)ammonium tetrakis(pentafluorophenyl) borate,
dicyclohexylammonium tetrakis(pentafluorophenyl) borate,
triphenylphosphonium tetrakis(pentafluorophenyl) borate,
tri(o-tolyl)phosphonium tetrakis(pentafluorophenyl) borate, and
tri(2,6-dimethylphenyl)phosphonium tetrakis (pentafluorophenyl) borate.

17. The method of claim 1 wherein the polymerization reactor is a continuous gas phase polymerization reactor that has been charged with an initial polymer charge of the same material as the product to be manufactured.

18. The method of claim 17 wherein product is continuously or intermittently discharged from the polymerization reactor in a manner that maintains a constant volume, level or weight of product in the reactor.

19. The method of claim 1 wherein the monomer comprises one or more monomers selected from the group consisting of ethylene, propylene, butene-1, pentene-1, 4-methyl-pentene-1, hexene-1, octene-1, decene-1, 3-methyl-pentene-1, 4-methyl pentene-1, norbomene, and norbomadiene.

20. The method of claim 1 wherein the monomer is selected from the group consisting of monomers having 2 to 30 carbon atoms.

* * * * *